May 31, 1966     R. R. MYERS     3,254,151
PARALLEL BUNDLE CONDUCTOR SPACERS
Filed Aug. 3, 1964     2 Sheets-Sheet 1
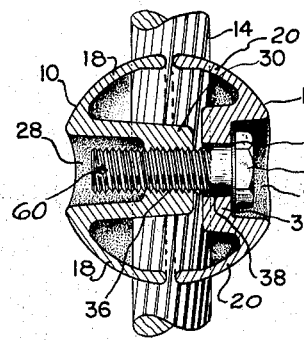
*Fig. 6*
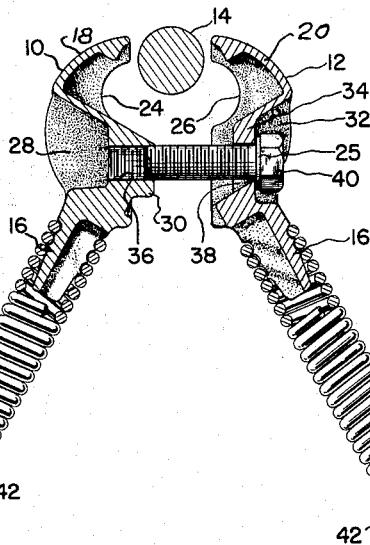
*Fig. 1*
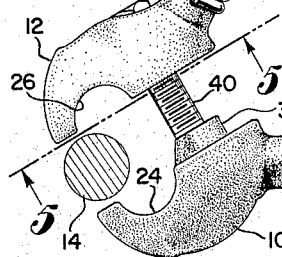
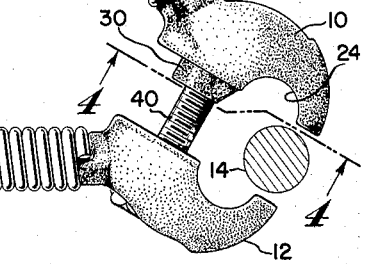
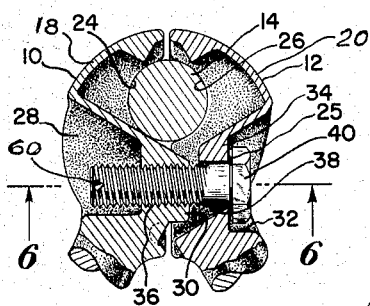
*Fig. 3*
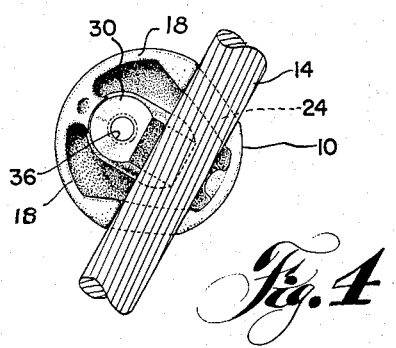
*Fig. 4*
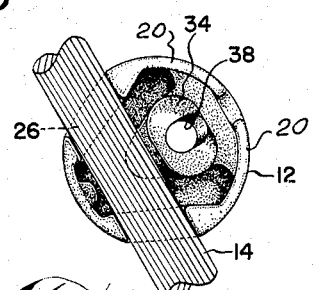
*Fig. 5*
INVENTOR.
ROBERT R. MYERS
BY *S. Ernest Low*
ATTORNEY May 31, 1966  R. R. MYERS  3,254,151
PARALLEL BUNDLE CONDUCTOR SPACERS
Filed Aug. 3, 1964  2 Sheets-Sheet 2
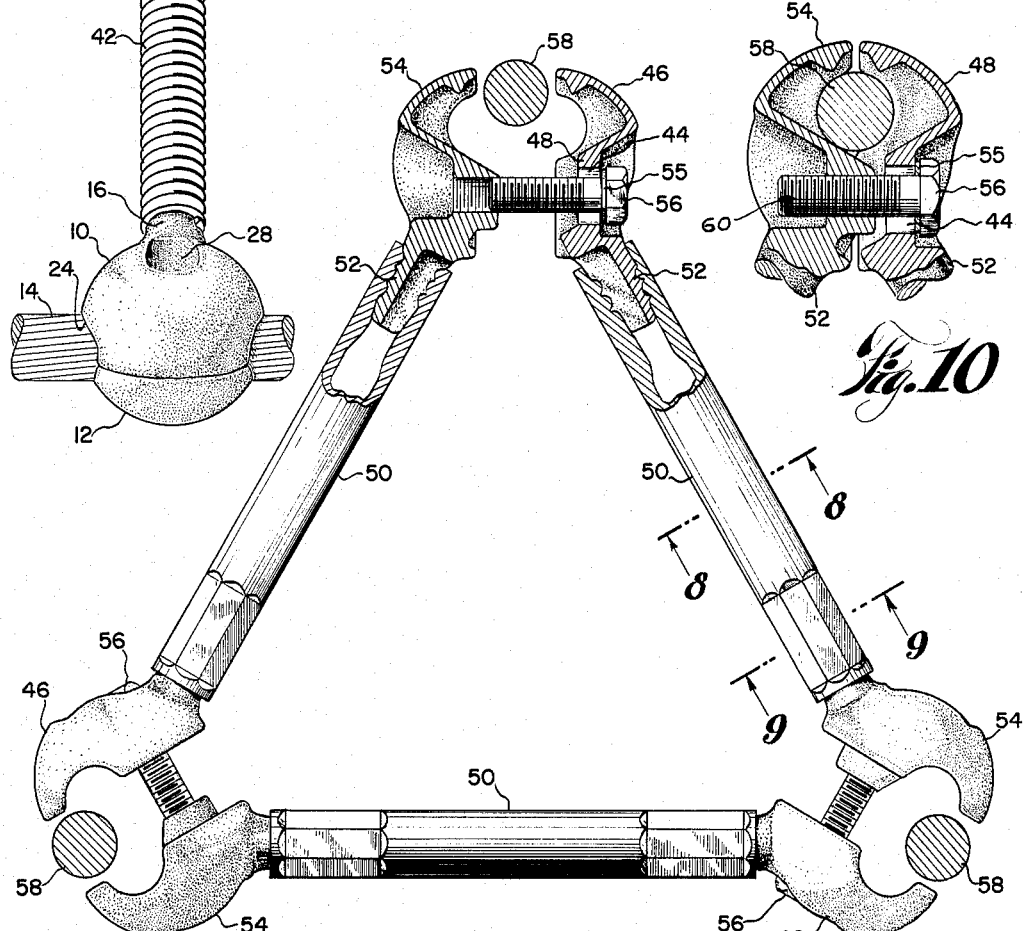

United States Patent Office 3,254,151
Patented May 31, 1966

3,254,151
PARALLEL BUNDLE CONDUCTOR SPACERS
Robert R. Myers, Port Vue, McKeesport, Pa., assignor to Aluminum Company of America, Pittsburgh, Pa., a corporation of Pennsylvania
Filed Aug. 3, 1964, Ser. No. 387,132
3 Claims. (Cl. 174—40)

This invention relates to unitary pre-assembled spacer devices for separating installation and association with suspended electrical bundle conductors or cables. By the term "bundle conductors or cables," as used herein and in the claims, is meant a group of three or more suspended elongate electrical conductors in which the group comprises a single phase of an electrical transmission circuit or distribution system.

Increasing importance is attaching to the substitution of bundle conductors for conventional single line larger diameter cable or conductor in high voltage electrical transmission and distribution systems because of the many advantages accruing to the use of conventional size conductors, including: (1) adaptation and use of available and conventionally stocked standard size cable accessories, such as drop line connectors, splicing sleeves, vibration dampers, dead ends and like hardware; (2) reduction in detrimental surface corona losses; (3) lowered transmission line reactance; (4) increased current-carrying capacity compared to single conductor of substantially equivalent cross-sectional area; and (5) reduced surge impedance. All of the stated advantages are only capable of attainment in the event the spacers employed in bundle conductor installations incorporate means for positive separation of the individual conductors in the bundle thereof, while permitting independent movement of the separate conductors resulting from or caused by wind-induced vibrations and meteorological conditions, as well as from electro-dynamic forces developed between the several conductors in the bundle.

The aforesaid stated advantages of bundle conductors have all been acknowledged in the art. However, no satisfactory spacer structure has been yet developed, proposed, or made commercially available which lends itself to ready installation on three or more suspended conductors in a bundle thereof other than by patient and time-consuming manual performance by a skilled workman and, in many cases, at least two workmen, with special tools being required to handle and manipulate the conventionally initially disassembled elements of presently available spacers.

It is therefore an object of the present invention to provide a bundle conductor spacer device or mechanism, comprising the required minimum number of elemental parts or members in initial unitary integrated pre-assembled condition, which can be manipulated by a single workman to install the same by adjustment of a minimum number of securing members at the points or areas of clamping attachment of the spacer device to three or more conductors in a bundle thereof.

It is a further object of the invention to provide compact utilitarian bundle conductor spacer means incorporating unitarily pre-assembled strut and clamping elements capable of ready initial disposition and subsequent clamping attachment thereof in a final installation of the spacer means on a bundle of three or more conductors.

Other objects of the invention will be manifest to those skilled in the art, including the essential provision of a spacer device which is capable of providing and maintaining intimate and firm electrical contact between the spacer attaching instrumentalities and conductors supporting the same to avoid any loose connections between the individual single phase current-carrying conductors and conductor-clamping elements of the spacer in electrical engagement therewith, existence of which looseness would create radio interference in high voltage current distribution, from a consideration of the following description and drawings, in which:

FIG. 1 illustrates a transverse elevational view, in partial section, of a spacer device or mechanism falling within the scope and intent of the invention in its initial pre-assembled as-fabricated and delivered on the job unitary condition following initial association thereof in relationship to a bundle of three conductors;

FIG. 2 illustrates an exterior side elevational view of the finally installed spacer of FIG. 1;

FIG. 3 illustrates a fragmentary sectional view of the spacer device of FIGS. 1 and 2 in firm final clamped installation on one of the conductors in the bundle thereof;

FIG. 4 illustrates a fragmentary view in the direction of the arrows 4—4 in FIG. 1;

FIG. 5 illustrates a fragmentary view in the direction of the arrows 5—5 in FIG. 1;

FIG. 6 illustrates a sectional view on the plane 6—6 of FIG. 3;

FIG. 7 illustrates a transverse elevational view, in partial section, of a slightly modified form of spacer of the invention in its initial pre-assembled as-fabricated and delivered on the job unitary condition in initial assocation in relation to a bundle of three conductors;

FIG. 8 illustrates a sectional view on the plane 8—8 of FIG. 7;

FIG. 9 illustrates a sectional view on the plane 9—9 of FIG. 7; and

FIG. 10 illustrates a fragmentary sectional view of the spacer device of FIGS. 7 through 9 in firm final clamped installation on one of the conductors in the bundle thereof.

Basically, and from the aforesaid illustrations, it will be observed that the spacer devices or mechanisms of the invention are initially pre-assembled and delivered on the job in self-supporting unitary assembly in condition for initial self-sustaining disposition and final application on three or more conductors of a bundle thereof by a sole workman without the aid or necessity of special tools, auxiliary supporting tackle, or additional manual assistance. Initial relatively outwardly spaced or separated condition of the paired clamping elements of initially as-delivered unitarily pre-assembled spacer mechanisms of the invention, and subsequent final clamped installation thereof on the conductors in a bundle thereof, is attributable to the character and structural relationship of the clamping elements in each pair thereof, whereby restrainable relative movement and telescopic entry of an extension or projection on one of the clamping elements within a recess or cavity within the second clamping element of each cooperating pair of the same obtains, in the absence of complete outward separation and dismantling of the several integrated elements of the initially pre-assembled spacer mechanisms of the invention.

From the illustrations, and particularly the spacer embodiment of FIGS. 1 through 6, it will be observed that spacers of the invention incorporate strut-supported and paired cooperating male and female clamping or conductor-engaging members or elements 10 and 12, respectively, for each of the three or more conductors 14 in a bundle. In this regard, the clamping elements or members 10 and 12 are fabricated from electrically conductive materials, such as aluminum or copper, which are preferably manufactured as castings to permit repetitive duplication and accurate mass production of the same. Commercial clamping elements of the invention have been successfully produced in the form of light weight aluminum alloy die castings.

The general exterior configuration of the clamping elements 10 and 12 is such as to provide outwardly directed substantially and predominately curvilinearly rounded smooth convexly blended surfaces to thereby eliminate exteriorly exposed sharply defining corona-generating points or equivalent sharp intersecting surfaces.

More specific inspection of the several views illustrating the clamping elements or members 10 and 12 will reveal that they are of generally cup or half shell shape and that each supports an angularly disposed and outwardly projecting strut-attaching externally threaded stud, nubbin or spud 16. In fact the members 10 and 12 are preferably of substantially semi-hemispherical exterior configuration with the extending spud elements 16 preferably and generally U-shaped in transverse cross-section (FIGS. 1 and 9). The clamping members 10 and 12 are further interiorly sculptured or cavitied to lighten the same and provide an outer wall-defining depending skirt or flange 18, in the case of the male clamping member 10, and depending skirt or flange 20, in the case of the female clamping member 12, which skirts or flanges are otherwise generally or substantially semi-circularly grooved or configurated to provide aligned cable or conductor-receiving and engaging cooperating transversely spaced saddle surfaces 24 and 26, respectively, outboard or remote to the extending threaded spud 16 of each clamping member.

Cardinal structural features of the male and female paired clamping members 10 and 12 comprise the provision of an exteriorly inwardly depressed recess or cavity 28 in smooth contiguous blending relationship with the outer surface of the male clamping element 10 terminating in an inwardly projecting elongate boss 30, as well as the substantially similarly exteriorly inwardly depressed recess or cavity 32 in the outer surface of the female clamping element 12. The recess 32 preferably provides a thickened web 34 of less axial length or depth than the aforesaid male projection or boss 30. The boss 30 is otherwise provided with a threaded bore 36, whereas the thickened web 34 is suitably apertured at 38 to accommodate and receive a clamping or securing bolt or similar threaded fastener 40.

On comparison of FIGS. 1 and 3, it will be observed that the axial length under the head of the thread-bearing shank of the clamping and securing fastener or bolt 40 is greater than the total axial thicknesses of the boss 30 and web 34 by an axial amount sufficient to insure engagement of the threaded shank thereof within its complementary threaded bore 36 in the male clamping member 10, in initial pre-assembled and restrained outwardly separated or spaced condition of the clamping elements 10 and 12 in each pair thereof, to permit entrance of a conductor 14 of the bundle thereof between the so separated clamping elements 10 and 12.

Final installation and secured assembly of the clamping members 10 and 12 in each pair thereof (FIG. 3) is accomplished by advancing the bolt member 40 axially into the threaded bore 36 in the male clamping element 10, thereby serving to draw the clamping elements 10 and 12 in each pair thereof into final clamping engagement of their oppositely disposed configurated saddle surfaces or bearings 24 and 26 on the exterior surface of a conductor 14 therebetween. In this regard, and of extreme structural significance in respect to each pair of clamping elements 10 and 12, the inwardly projecting boss 30 of the male clamping member 10 must be of such axial length to provide initial engaging connection with the securing bolt 40, whereas the thickened web 34 of the female clamping element 12 in axial alignment with the male boss 30 must provide a cavity thereunder to uninterferingly receive the extending boss 30 in final clamped condition of the paired clamping elements 10 and 12 on each of the conductors 14. To insure this relationship, the male boss 30 extends below the depending outer wall skirt or flange 18 of the male clamping member 10 and the thickened web 34 is disposed outwardly above the depending skirt or flange 20 of the female clamping member 12, the shank length of the bolt 40 being carefully and accurately determined to assure initial restrained unitary pre-assembly of a spacer, with the paired clamping elements 10 and 12 outwardly restrainedly separated, as illustrated in FIG. 1, for initial disposition of the spacer in respect to three or more conductors 14 in a bundle thereof (FIG. 1), and providing for final clamped and secured installation of the spacer device on the conductors (FIG. 3), without having the bolt 40 extended beyond the exterior surface of the male clamping member 10, where it would establish a relatively sharp and exposed corona-generating surface. A suitable lock washer 25 under the head of each of the clamp securing bolts 40 is recommended.

The clamping elements 10 and 12 are conventionally connected by struts, the close coiled cylindrical and resilient springs 42 being illustrated for this purpose in opposite end threaded engagement with the extending threaded rigid spud or stud 16 carried by each of the clamping elements 10 and 12 in the spacer device or mechanism of FIGS. 1 through 6.

Reference to FIGS. 1 and 3 will further reveal that the unthreaded bore 38, extending through the thickened bottom web 34 of the female clamping element 12, is preferably of relatively circular and of close tolerance to the diameter of the bolt 40 in the outwardly directed plane surface of the depressed recess 32 in the female clamping member. Otherwise the bore 38 preferably diverges downwardly and inwardly in respect to the axial thickness of the web 34 towards the strut attaching spud 16 of the female clamping element 12. This interior configuration of the bore 38 has been discovered useful, where the struts 42 are of the resilient type, in that inward flexing of the resilient coiled spring struts 42, or similar flexible strut members, in respect to the longitudinal axis of each of the struts, causes angular outward and opposite relative deflection and disposition of the paired male and female clamping elements 10 and 12 in respect to the fixed axis of the clamping bolt 40, to thereby widen or enlarge the entrance gap between each pair of the clamping elements 10 and 12 during initial disposition of the pre-assembled unitary spacer device on each conductor 14 in the bundle thereof.

The spacer device of FIGS. 7 through 10 is similar in many respects to that previously described except for the incorporation in the device of this embodiment of spacer of rigid tubular strut members 50. In this embodiment, the rigid tubular struts 50 are each internally threaded at their opposite ends for threaded engagement on the rigid threaded nubbin, stud or spud extension 52 carried by each of the clamping elements 46 and 54 in FIG. 7. The threaded connections of the struts 50 to the clamping elements 46 and 54 are preferably further secured against separation by compressing the struts 50 over opposite axial end lengths thereof substantially equivalent to, or slightly in excess of, the axial length of each spud 52 interiorly supporting the same. Compression dies of hexagonal cross-sectional configuration (FIG. 9) have been successfully employed for this purpose. Manifestly the rigid tubular struts 50 could be replaced by rigid rods or bars in rigid or conventional pivotal attachment to the clamping elements 46 and 54.

The non-resilient and non-flexing nature of the rigid struts 50, or their equivalents, in the spacer device of FIGS. 7 through 10, when compared to the resilience and axial flexibility of the close coiled spring strut members 42 of the spacer device of FIGS. 1 through 6, recommend the use of an elongated slot or aperture 44 in the thickened bottom web 48 of the female clamping element 46 for receiving the securing bolt 56 to thereby permit greater freedom in relative movement of the female clamping elements 46 in respect to their adjacent attached or connected male clamping elements 54 in the unitary pre-assembled application of the rigid strut spacer device on three or more conductors 58 in a bundle thereof. It will be appreciated that the elongated apertures 44 (FIGS. 7 and 10) extend axially through the thickened webs 48 and have their major axes in substantial coincidence with the longitudinal axis of each of the rigid struts 50, the minor axes of the apertures 44 providing close tolerance for the clamping bolts 56 received therethrough. A lock washer 55 is also recommended under the head of each of the clamping and securing bolts 56 of this spacer embodiment of the invention.

It will be observed that the spud or stud extensions 16 and 52 of the spacer clamp elements of the invention, besides being of generally U-shaped transverse cross-section (FIGS. 1 and 7), are also tapered towards their free ends and thereby provide a terminal tapering unthreaded pilot surface for ease of entry into the opposite ends of the resilient coiled spring struts 42 and rigid tubular struts 50, respectively. In this connection, the U-shaped transverse cross-section provides a channel slot or opening into which unavoidable and detrimental lathe, grinding and similarly produced metal turnings, cuttings or particles, accumulated in the fabrication of the coiled spring and tubular struts, are automatically discharged during pre-assembly of the spacer devices. Also, the U-shaped transverse cross-sectional configuration of the spuds or studs 16 and 52 imparts resiliency and outwardly exerted coupling pressure thereof against the circumferential inward pressure of the resilent coiled spring struts 42, as well as against the inward compressive forces developed by the swaged ends of the rigid tubular struts 50.

It will be fully understood that both forms of spacer device above described and illustrated herein have permitted their initial unitary pre-assembly in self-supporting restrained integrated assembly of their essential elements. It will also be appreciated that the initially pre-assembled and on the job delivered spacer devices of the invention permit of their initial unitary self-supporting disposition and final clamped installation thereof on three or more conductors constituting the bundle thereof to be positively separated by the spacer devices of the invention. Of further cardinal significance is the fact that the spacer devices of the invention can be manipulated by a sole unskilled workman without the necessity of special tools, installation tackle, and additional manual assistance. It will also be observed, as a result of the permissible structural nesting design of the paired male and female clamping elements 10, 12 and 46, 54 that the terminal threaded ends of the clamping bolts 40 and 56 never extend beyond the outer curved surfaces of the male clamping members 10 and 54, respectively, to otherwise provide sharp corona-generating surfaces, as distinguished from the smooth rounded heads of the aforesaid clamping bolts. End threads of the clamping bolts 40 and 56 may be peened or otherwise flattened, as at 60 (FIGS. 3, 6 and 10), following installation of spacer devices of the invention, to insure against accidental and unintentional displacement thereof.

The invention having been fully described in terms of two selected embodiments and practices thereof, what is claimed is:

1. An initially pre-assembled unitary spacer device for separating installation in a transverse plane on a bundle of at least three parallel elongate conductors, said device comprising:
   (a) a pair of separable clamping elements for receiving and clampingly engaging one each of the conductors in the bundle,
   (b) each pair of clamping elements comprising a male and a female member of generally hollow cup shape presenting outwardly and oppositely directed smooth blending curvilinear exterior surface,
   (c) said male member having a cavity depressed into its outwardly directed surface and terminating in an inwardly projecting boss provided with a threaded bore therethrough terminating inwardly beyond the depressed cavity thereof,
   (d) said female member having a cavity depressed into its outwardly directed surface terminating in an inwardly directed bore in substantial axial registry with the threaded bore in the male projecting boss,
   (e) a strut member secured at its opposite ends to a male and female clamping member of adjacent pairs of the clamping elements,
   (f) a securing and restraining member extending through the bore in the female member into threaded connection within the threaded bore in the inwardly projecting threaded boss of the male member in each pair thereof and providing a unitary interconnected self-supporting pre-assembly of the spacer device for initial disposition in a plane transverse to the axes of the conductors in the bundle with a conductor uninterferingly receivable between each pair of clamping elements in outward interconnected separation thereof,
   (g) aligned conductor receiving saddle bearings in the male and female members remote to and outboard of their attachment to the strut and securing members in each pair of clamping elements, and
   (h) said securing members on manipulation to threadingly advance the same into the threaded bore in the male member responding to clampingly engage the conductor receiving saddle bearings in each pair of clamping elements into firm clamped installation of the pre-assembled unitary spacer device on said conductors with
   (i) said projecting boss of the male member drawn inwardly and disposed within the interior of said female member.

2. An initially pre-assembled unitary spacer device for separating installation in a transverse plane on a bundle of at least three parallel elongate conductors, said device comprising:
   (a) a pair of male and female separable clamping elements transversely grooved on facing surfaces thereof for receiving and clampingly engaging one each of the conductors in the bundle,
   (b) a strut member connected at its opposite ends to a male and a female element of adjacent pairs thereof remote to the groove in each of the elements,
   (c) the male element having a cavity depressed into an outwardly directed surface remote to its grooved surface intermediate the groove and connection to the strut end, said cavity terminating in an inwardly projecting boss provided with a threaded bore therethrough terminating inwardly beyond the grooved surface thereof,
   (d) the female element having a cavity depressed into an outwardly directed surface remote to its grooved surface intermediate the groove and connection to the strut end, said cavity terminating in a through bore in substantial axial alignment with the axis of the threaded bore in the boss of the male element and the female bore terminating within the female element between its grooved and outwardly directed surfaces,
   (e) a securing and restraining member extending through the bore in the female element into threaded connection within the threaded bore in the inwardly projecting boss of the male element in each pair thereof and providing a unitary interconnected self-supporting pre-assembly of the spacer device for initial disposition in a plane transverse to the axes of the conductors in the bundle with a conductor uninterferingly receivable between each pair of male and female clamping elements in outward interconnected separation thereof,
   (f) each said securing and restraining member on threading advance into the threaded bore in a male element responding to clampingly engage a conductor between each pair of male and female elements within the transverse grooves in the facing surfaces thereof with the projecting boss of each male member drawn inwardly and disposed within its paired female element.

3. The pre-assembled unitary spacer device in accordance with the structure defined in claim 2 having the securing and restraining members each selected in such axial length to confine extension thereof within the depressed cavity in the outer surface of each male element on installed assembly of the spacer device.

References Cited by the Examiner

UNITED STATES PATENTS

| | | |
|---|---|---|
| 3,013,244 | 12/1961 | Rudy. |
| 3,070,651 | 12/1962 | Semple et al. _____ 174—146 X |
| 3,113,173 | 12/1963 | Horovitz _____ 174—146 X |
| 3,121,770 | 2/1964 | Dallye _____ 174—146 X |
| 3,176,061 | 3/1965 | Montegani et al. __ 174—146 X |

References Cited by the Applicant

UNITED STATES PATENTS 3,111,552   11/1963   Cox et al.

FOREIGN PATENTS

| | | |
|---|---|---|
| 939,459 | 2/1956 | Germany. |
| 971,606 | 2/1959 | Germany. |

BERNARD A. GILHEANY, *Primary Examiner.*

LARAMIE E. ASKIN, *Examiner.*